(12) United States Patent
Gardt et al.

(10) Patent No.: US 10,754,356 B2
(45) Date of Patent: Aug. 25, 2020

(54) METHOD FOR ACTUATING AT LEAST ONE SOLENOID VALVE

(71) Applicant: Robert Bosch GmbH, Stuttgart (DE)

(72) Inventors: Andrej Gardt, Abstatt (DE);
Christoph Eisele, Heilbronn (DE);
Valentin Schubitschew, Tamm (DE);
Volker Edelmann, Buchen (DE)

(73) Assignee: Robert Bosch GmbH, Stuttgart (DE)

( * ) Notice: Subject to any disclaimer, the term of this patent is extended or adjusted under 35 U.S.C. 154(b) by 135 days.

(21) Appl. No.: 15/952,012

(22) Filed: Apr. 12, 2018

(65) Prior Publication Data

US 2018/0321695 A1   Nov. 8, 2018

(30) Foreign Application Priority Data

May 8, 2017   (DE) .................. 10 2017 207 685

(51) Int. Cl.
| | | |
|---|---|---|
| *F16K 31/06* | (2006.01) | |
| *G05D 7/06* | (2006.01) | |
| *H01F 7/18* | (2006.01) | |
| *B60T 8/36* | (2006.01) | |
| *B60T 8/30* | (2006.01) | |
| *B60T 13/68* | (2006.01) | |
| *B60T 15/02* | (2006.01) | |

(52) U.S. Cl.
CPC ............ *G05D 7/0623* (2013.01); *B60T 8/30* (2013.01); *B60T 8/303* (2013.01); *B60T 8/306* (2013.01); *B60T 8/36* (2013.01); *F16K 31/0675* (2013.01); *H01F 7/18* (2013.01); *B60T 13/68* (2013.01); *B60T 15/025* (2013.01)

(58) Field of Classification Search
CPC ...... F16K 31/0675; H01F 7/18; B60T 15/025; B60T 13/68; B60T 8/30; B60T 8/303; B60T 8/306; B60T 8/36
See application file for complete search history.

(56) References Cited

U.S. PATENT DOCUMENTS

| | | | | |
|---|---|---|---|---|
| 4,726,389 A | * | 2/1988 | Minoura | ............. F02D 41/2096 137/1 |
| 5,261,730 A | * | 11/1993 | Steiner | ..................... B60T 7/12 303/113.4 |

(Continued)

FOREIGN PATENT DOCUMENTS

| | | |
|---|---|---|
| CN | 1886286 A | 12/2006 |
| DE | 198 33 830 A1 | 2/2000 |

(Continued)

*Primary Examiner* — Matthew W Jellett
(74) *Attorney, Agent, or Firm* — Maginot, Moore & Beck LLP

(57) ABSTRACT

A method for actuating at least one solenoid valve includes detecting a valve actuation signal, energizing the at least one solenoid valve with a specific constant control current for a specific actuation time which follows the detection of the valve actuation signal, and increasing the control current to a full actuation current for a full actuation time which follows the actuation time. The specific constant control current and the actuation time are dimensioned in such a way that at least two different types of solenoid valves can be at least partially opened by the control current during the actuation time.

10 Claims, 1 Drawing Sheet

(56) References Cited

U.S. PATENT DOCUMENTS

| | | | |
|---|---|---|---|
| 6,560,088 B1* | 5/2003 | Beck | F01L 9/04 |
| | | | 251/129.01 |
| 7,992,947 B2* | 8/2011 | Kaestner | B60T 8/36 |
| | | | 303/119.2 |
| 8,240,781 B2* | 8/2012 | Heckmann | B60T 8/90 |
| | | | 303/119.1 |
| 9,074,701 B2* | 7/2015 | Karl | B60T 8/363 |
| 9,512,801 B2* | 12/2016 | Nishimura | F02D 41/20 |
| 10,288,186 B2* | 5/2019 | Gardt | F16K 31/06 |
| 2010/0213758 A1* | 8/2010 | Nanahara | B60T 8/363 |
| | | | 303/20 |
| 2019/0061532 A1* | 2/2019 | Maruyama | B60T 8/17 |

FOREIGN PATENT DOCUMENTS

| | | |
|---|---|---|
| DE | 100 05 231 A1 | 8/2001 |
| DE | 100 25 670 A1 | 11/2001 |
| EP | 0 745 764 B1 | 3/2001 |

\* cited by examiner

METHOD FOR ACTUATING AT LEAST ONE SOLENOID VALVE

This application claims priority under 35 U.S.C. § 119 to patent application no. DE 10 2017 207 685.2, filed on May 8, 2017 in Germany, the disclosure of which is incorporated herein by reference in its entirety.

The disclosure relates to a method for actuating at least one solenoid valve of a valve arrangement having at least two different types of solenoid valves. The disclosure can be used, in particular, for actuating the current of the solenoid valves of, for example, ABS, TCS, ESP and/or IPB systems. In this context, the abbreviations ABS stand for anti-lock brake system, TCS for traction control system, ESP for electronic stability program and IPB for integrated power brake.

BACKGROUND

Basically, a solenoid valve serves as technical component for controlling the inlet or outlet of gases or liquids or performing open-loop or closed-loop control of the direction of flow. In particular in conjunction with solenoid valves which are used in motor vehicles, efforts have been made for some time now to ensure that they open as quietly as possible. However, the problem regularly arises that in a motor vehicle different types of solenoid valves can be installed in one valve arrangement, so that solutions for suppressing or reducing the generation of noise when the valves open have hitherto been designed as a function of the different types of solenoid valves.

Therefore, for example in the case of a TCS actuation system which has different types of solenoid valves, referred to as the "refresh pulse" which constitutes the energization which ensures that each solenoid valve is reliably opened, there is a preceding current profile which is intended to open the respective valve as quietly as possible in the pressureless state and is designed for this purpose as a function of different types of solenoid valves.

Said current profile is embodied in the manner of a current staircase and is illustrated schematically in FIG. 1. The current profile 4 is basically divided into a generally comparatively short actuation time 2 (also referred to as NVH (noise vibration harshness) pre-actuation), and a directly following full actuation time 3, wherein the actuation time 2 serves to open one or more valves of the valve arrangement as quietly as possible in the pressureless state, while during the full actuation time 3 it is to be ensured that the valve or valves is/are opened. In order to ensure this, the valve or valves is/are energized with a refresh pulse 5 at the start of the full actuation time 3. The refresh pulse 5 has a constant full actuation current 11 which is dimensioned in such a way that it is ensured that each type of solenoid valve of the valve arrangement can be reliably opened.

The current profile 4 is designed to be able to switch or to switch all the valves of the valve arrangement as quietly as possible with the full actuation current 11 before the refresh pulse 5. For this purpose, the current profile is staircase-shaped. The current profile 4 usually has a first step 6, a second step 7 and a third step 8. During the energization at the first step 6, the solenoid valve types are intended to open quietly with comparatively low opening forces. During the energization at the third step 8, the solenoid valve types are intended to open quietly with comparatively high opening forces. During the energization at the second step 7, the solenoid valve types are intended to open quietly with typical opening forces. In this context, the low and high opening forces are considered in comparison with the typical opening forces.

SUMMARY

The disclosure proposes a method for actuating at least one solenoid valve, comprising at least the following steps:
a) detecting a valve actuation signal,
b) energizing the at least one solenoid valve with a specific, constant control current for a specific actuation time which follows the detection of the valve actuation signal,
c) increasing the control current to a full actuation current for a full actuation time which follows the actuation time,
wherein the specific constant control current and the actuation time are dimensioned in such a way that at least two different types of solenoid valves can be at least partially opened by the specific control current during the actuation time.

The solenoid valve is particularly preferably part of a valve arrangement with at least two different types of solenoid valves, wherein the two types of solenoid valves in the valve arrangement are actuated in accordance with steps a) to c), and in this context the same constant control current is applied in the method step b), preferably during the same actuation time.

The term "the same control current" means in this context a control current with the same ampage. The actuation time can also be referred to as NVH (noise vibration harshness) pre-actuation or NVH pre-actuation time and serves, in particular, to reduce the noise and/or vibrations. The full actuation time can also be referred to as an opening time and serves, in particular, for the actual actuation of the valve. Furthermore, the full actuation current can also be referred to as an opening current.

The indicated sequence of the method steps a), b) and c) results during a regular sequence of the method. The method contributes, in particular, to switching the different types of solenoid valves as quietly as possible and/or with as little vibration as possible. Here, the method departs from known current profiles which are configured with different steps during the actuation time as a function of the different types of solenoid valves. Instead, within the scope of the disclosure it has surprisingly been found that overall a quieter switching noise of the solenoid valves can be obtained if the different types of solenoid valves are energized with just one (the same) current step during the actuation time (a total actuation time) or the same actuation time.

The valve arrangement has at least two, preferably at least three, different types of solenoid valves. The solenoid valve types differ, in particular, in their opening forces, i.e. in the force which is necessary to open a specific type of solenoid valve. Therefore, according to regulations or owing to manufacture-related tolerances there are at least two types of solenoid valves, which open, in particular, at different opening forces, in the valve arrangement.

In step a), the valve actuation signal is detected at the start of the method. The valve actuation signal is preferably a valve opening signal. The valve opening signal can be transmitted by a superordinate open-loop or closed-loop control system, for example a driving safety system of a motor vehicle, to an electronic control unit which brings about the energization of the at least one solenoid valve and is assigned to the valve arrangement. The electronic control unit which is assigned to the valve arrangement generally has means for detecting and evaluating the valve actuation signal.

In step b) the at least one solenoid valve is energized with a specific constant control current for a specific (pre-) actuation time which (directly) follows the detection of the valve actuation signal. In step b) the at least two different types of solenoid valves or even all solenoid valves of the valve arrangement are preferably energized with the same constant control current for the specific or the same actuation time which (directly) follows the detection of the valve actuation signal.

In step c) the control current is increased (starting from the current level of the specific and constant control current set in step b)) for a full actuation time which (directly) follows the actuation time. In step c) the at least one solenoid valve, preferably the at least two different types of solenoid valves or even all the solenoid valves of the valve arrangement are preferably energized with what is referred to as a "refresh pulse" at the start of the full actuation time. The refresh pulse constitutes here a current level which is given high dimensions such that it is therefore ensured that each solenoid valve of the valve arrangement is reliably opened. During the full actuation time the control current can be increased further after the refresh pulse and/or (slightly) lowered again. At the end of the full actuation time, the control current is generally lowered or switched off again in such a way that the at least one solenoid valve (completely) closes again.

The specific, constant control current is dimensioned here in such a way that the at least two different types of solenoid valves or even all the types of solenoid valves of the valve arrangement are intended to be able to be opened, or to open, at least partially, preferably completely, by means of the specific control current during the actuation time. Preferably, not only the specific control current and the specific actuation time are given dimensions of the same magnitude for all the types of solenoid valves of the valve arrangement.

The specific constant control current is preferably dimensioned in such a way that the at least one solenoid valve can be opened or opens (completely) by means of the specific control current directly before or at the end of the actuation time. The specific constant control current is particularly preferably dimensioned in such a way that the at least two different types of solenoid valves of the valve arrangement can be opened or open (completely) by means of the specific control current directly before or at the end of the actuation time.

According to one advantageous refinement it is proposed that the at least one solenoid valve is a solenoid valve which is closed in the currentless state, or the solenoid valves of the valve arrangement are solenoid valves which are closed in the currentless state. Furthermore, the solenoid valves of the valve arrangement are preferably, in particular, high-pressure switching valves which are closed in the currentless state.

According to a further advantageous refinement it is proposed that the at least one solenoid valve is in a pressureless state at least at the start of the actuation time. The at least one solenoid valve is particularly preferably in a pressureless state during step b). This means, in other words, in particular that a medium, for example a fluid, which is pressurized or under (excess) pressure is not (yet) applied to the at least one solenoid valve, at least at the start of the actuation time or during step b).

The actuation time 2 can be predetermined and, in particular, be in the range from 10 to 20 ms and can be, for example, 15 ms (milliseconds). The actuation time is, in particular, significantly longer than an individual step of a staircase-shaped current profile from the prior art. A concept on which the staircase-shaped current profile is based is that the various steps are each respectively suitable for activating different valve types. While specific valve types already open by means of the energization with the first step, other valve types open only by means of energization with the second step or third step. In particular for valves which open with one of the later steps (second step, third step, etc.), only a little time remains until the complete opening as a result of the short duration of the individual step. Therefore, such valves are not yet completely open when the refresh pulse occurs. As a result of the refresh pulse, a valve body of such valves is still strongly accelerated, and a loud impact noise occurs when the valve body reaches the completely opened position. In the case of valves which already open at a relatively early step, if appropriate a strong acceleration, which also brings about a loud impact noise, already occurs as a result of the occurrence of a relatively late step. It has become apparent that such impact noises can be more effectively avoided by means of a uniform control current, which is adapted to the valve type(s) and which is present for a relatively long (or overall equally long) actuation time than by the staircase-shaped current profile from the prior art. The ampage of the control current is selected here such that the valve reliably opens, but an excessively strong acceleration of a valve body does not occur. If the actuation time is permanently predefined or predetermined, the constant control current can, for example, be selected such that the valve switches as far as possible at the end of the predefined actuation time, in particular before the refresh pulse occurs. It is therefore possible to ensure that the time which is available for reducing the noise and/or vibration is completely utilized, with the result that the valve switches as slowly (and therefore as quietly) as possible.

The method is particularly advantageous if the at least one solenoid valve or the valve arrangement is a component of a technical driving safety system of a motor vehicle. The technical driving safety system can be, for example, an ABS, TCS, ESP and/or IPB system. The technical driving safety system is preferably a TCS system. The introductory statements are referred to completely with respect to the explanation of the abbreviations.

Furthermore, there is to be a description here of a control device which is configured to actuate a solenoid valve in accordance with a described method. A computer program which is configured to execute the steps of the method proposed here, and a machine-readable storage medium on which this computer program is stored, are also to be described here. An electronic control unit, which is preferably arranged in a motor vehicle or serves for mounting in such a motor vehicle, can be provided as a device for carrying out the described method. The control unit accesses, for example, the computer program in order to execute the method. The details, features and advantageous refinements which are explained in conjunction with the method can correspondingly also occur in the computer program, the storage medium and/or the device as presented here, and vice versa. In this respect, reference is made to the entire scope of the statements therein for the purpose of giving more details and characterization of the features.

BRIEF DESCRIPTION OF THE DRAWINGS

The solution proposed here and the technical field thereof are explained in more detail below with reference to the figures. It is to be noted that the disclosure is not to be restricted by the exemplary embodiments shown. In particular, unless explicitly stated otherwise, it is also possible for partial aspects of the substantive contents which are explained in the figures to be extracted and combined with other components and/or realizations from other figures and/or the present description. In a schematic form.

DETAILED DESCRIPTION

Figure 1:
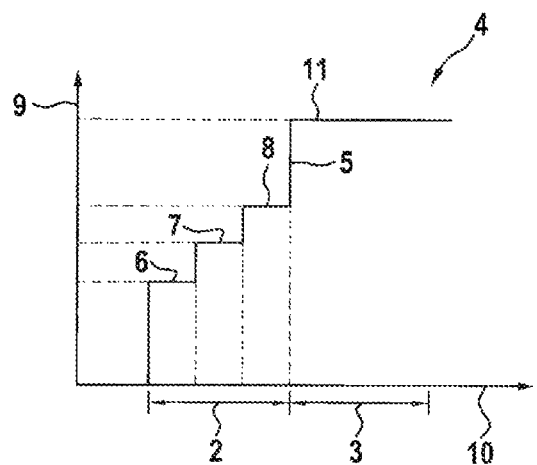
FIG. 1 shows a current profile according to the prior art.

FIG. 1 is a schematic view of a current profile 4 according to the prior art. According to the illustration in FIG. 1, the profile of the current 9 is plotted against the time 10. With respect to the further description of the current profile 4 reference is made to the above statements relating to the prior art.

Figure 2:
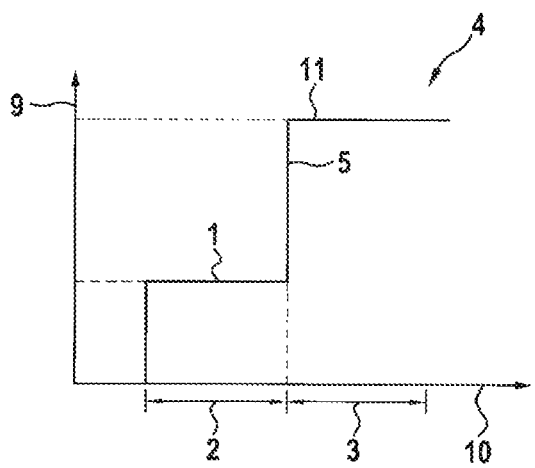
FIG. 2 shows a current profile which is generated with the method according to the disclosure.

FIG. 2 is a schematic view of a current profile 4 which is generated with a method according to the disclosure which serves to actuate at least one solenoid valve of a valve arrangement with at least two different types of solenoid valves. The profile of the current 9 is also plotted against the time 10 according to the illustration in FIG. 2.

In FIG. 2 it is apparent that the current profile 4 which is generated by a method according to the disclosure is also divided into an exemplary actuation time 2, which is short in comparison with the full actuation time 3, and a full actuation time 3 which (directly) follows the exemplary actuation time. The actuation time 2 is predetermined here and is, for example, 15 ms. The at least one solenoid valve is energized at a specific constant control current 1 during the (entire) actuation time 2. The specific constant control current 1 is dimensioned in such a way that the at least two different types of solenoid valves of the valve arrangement can be at least partially opened by means of the specific control current 1 during the actuation time 2. The specific constant control current 1 is advantageously dimensioned in such a way that the at least two different types of solenoid valves of the valve arrangement can be opened (completely) by means of the specific control current 1 directly before or at the end of the actuation time 2. The to actuation time 2 serves to open the at least one solenoid valve or the at least two different types of solenoid valves of the valve arrangement as quietly as possible in the pressureless state.

After the expiry of the actuation time 2, the control current is increased to a full actuation current 11 for a full actuation time 3 which (directly) follows the actuation time 2. During the full actuation time 3, the at least one solenoid valve is to be essentially completely opened. In order to ensure this, the at least one solenoid valve is energized, for example, with a refresh pulse 5 at the start of the full actuation time 3. The refresh pulse 5 is dimensioned in such a way that it is ensured that any type of solenoid valve of the valve arrangement can be reliably opened.

The method contributes, in particular, to switching different types of solenoid valves as quietly as possible and/or with as little vibration as possible.

What is claimed is:

1. A method for actuating at least two solenoid valves of a valve arrangement, the at least two solenoid valves being different types of solenoid valves that require differing amounts of force to open, comprising:
    detecting a valve actuation signal;
    energizing, for a first actuation time period, the at least two solenoid valves simultaneously with a first constant current in response to detecting the valve actuation signal, a magnitude of the first constant current and a duration of the first actuation time period being configured to at least partially open both of the at least two solenoid valves; and
    energizing, for a second actuation time period immediately following the first actuation time period, the at least two solenoid valves simultaneously with a second constant current, a magnitude of the second constant current and a duration of the second actuation time period being configured to completely open both of the at least two solenoid valves, the magnitude of the second constant current being greater than the magnitude of the first constant current.

2. The method according to claim 1, wherein the magnitude of the first constant current is configured to cause at least one of the at least two solenoid valves to completely open one of (i) immediately before an end of the first actuation time period and (ii) at the end of the first actuation time period.

3. The method according to claim 1, wherein the magnitude of the first constant current is configured to cause both of the at least two solenoid valves to completely open one of (i) immediately before an end of the first actuation time period and (ii) at the end of the first actuation time period.

4. The method according to claim 1, wherein the at least two solenoid valves are configured to be closed when no current is applied.

5. The method according to claim 1, further comprising:
    configuring the at least two solenoid valves in a pressureless state at least at a start of the first actuation time period.

6. The method according to claim 1, wherein the first actuation time period is pre-determined.

7. The method according to claim 1, wherein the valve arrangement is a component of a driving safety system of a motor vehicle.

8. The method according to claim 1, wherein a control device is configured to actuate at least two solenoid valves in accordance with the method.

9. The method according to claim 1, wherein a computer program is configured to execute the method.

10. The method according to claim 1, wherein the computer program is stored on a machine-readable storage medium.

* * * * *